(12) United States Patent
Frese et al.

(10) Patent No.: US 6,811,822 B2
(45) Date of Patent: Nov. 2, 2004

(54) METHOD OF WATERPROOFING THE SURFACE OF A POLYMER WORK PIECE

(75) Inventors: Ines Frese, Mainz (DE); Jens Hossfeld, Rosbach (DE)

(73) Assignee: Institut fur Mikrotechnik Mainz, Mainz (DE)

(*) Notice: Subject to any disclaimer, the term of this patent is extended or adjusted under 35 U.S.C. 154(b) by 74 days.

(21) Appl. No.: 10/221,521

(22) PCT Filed: Mar. 16, 2001

(86) PCT No.: PCT/DE01/01046
§ 371 (c)(1),
(2), (4) Date: Mar. 10, 2003

(87) PCT Pub. No.: WO01/68757
PCT Pub. Date: Sep. 20, 2001

(65) Prior Publication Data
US 2003/0185992 A1 Oct. 2, 2003

(30) Foreign Application Priority Data
Mar. 17, 2000 (DE) .......................... 100 13 311

(51) Int. Cl.[7] ................................. B05D 3/02
(52) U.S. Cl. ..................... 427/387; 264/343
(58) Field of Search ................. 427/387; 264/343

(56) References Cited

U.S. PATENT DOCUMENTS 5,338,877 A 8/1994 Sawada et al. ............. 556/440

FOREIGN PATENT DOCUMENTS

| DE | 1139467 | * 11/1962 |
| EP | 0 109 586 | 5/1984 |
| EP | 0 134 523 | 3/1985 |
| EP | 0 306 006 | 3/1989 |
| EP | 974696 | * 1/2000 |
| GB | 521590 | * 5/1940 |
| GB | 1265927 | * 3/1972 |
| JP | 48-024436 B | * 7/1973 |
| WO | 94/11421 | 5/1994 |

OTHER PUBLICATIONS

Ultraviolet Protection of Transparent PVC Sheets By Diffusion Coatings, Matthew Katz et al., Proceedings of the A.C.S. Div. of Coatings and Plastics, 36(1), pp. 202–205 (1976).

* cited by examiner

Primary Examiner—Erma Cameron
(74) Attorney, Agent, or Firm—Hudak, Shunk & Parine, Co. LPA

(57) ABSTRACT

The invention relates to a method of waterproofing the surface of a polymer work piece. The aim of the invention is to prevent liquid or gaseous, hydroxyl-group (OH group) containing substances, such as water, vapor or glycerol, from diffusing into a polymer surface. To this end, the work piece is treated with at least one organic solvent that blisters the surface of the polymer work piece, thereby diffusing at least one waterproofing agent dissolved in the solvent into the surface of the polymer work piece, said waterproofing agent being a silicon-organic compound. The solvent is allowed to react and is then removed from the polymer work piece, whereby at least a part of the waterproofing agent remains bound in the surface of the polymer work piece. The inventive method provides a means for treating, in one steep bath, polymer work pieces or work pieces with polymer surfaces of any shape and size and also polymer surfaces with cavities and bulges in a simple and cost-effective manner, requiring only small quantities of the waterproofing agent and extremely little time. The so treated polymer work piece can be used in areas of high temperature and/or regions with high ambient temperatures.

15 Claims, 3 Drawing Sheets

METHOD OF WATERPROOFING THE SURFACE OF A POLYMER WORK PIECE

FIELD OF THE INVENTION

The invention relates to a method for waterproofing the surface of a polymer workpiece.

BACKGROUND OF THE INVENTION

Waterproofing makes it possible to prevent liquid or gaseous hydroxyl group (OH group)-containing substances, such as water, water vapor, or glycein, from diffusing into a polymer surface.

It is know that the diffusion of liquids, such as water or glycerin, into the polymer surface is enhanced by a specific interaction between the functional groups of the polymer surface, e.g. carbonyl groups, and the hydroxyl groups of the liquid. Consequently, various known coating processes for modifying polymer surfaces aim to neutralize the functional ester or carbonyl groups. For this purpose, the polymer surface is treated, for instance, by using an oxygen plasma so that functional groups, such as OH groups, are formed on the polymer surface. Usually, the polymer surface is then chemically coated by a grafting reaction to prevent a specific interaction of the OH groups of the liquid with the carbonyl groups of the polymer surface.

In one method of this grafting technique, the chemical substance provided for the coating is added directly as a gas to the plasma and is thereby deposited on the polymer surface. This gas phase coating process makes it possible, for instance, to form Teflon-like coatings on the polymer surface by adding $C_4F_8$, or SiO-type coatings by adding hexamethyl disiloxane. In another method of the grafting technique, the chemical substance provided for the coating is mixed into a solution for wet application and is then applied to the polymer surface by means of this solution. This method is used, for instance, to produce a silane coating on the polymer surface by treating the polymer surface with an octadecyl trimethoxy silane/toluene solution. Both of these methods, however, can be used only at locations on the polymer surface where the functional OH groups were created, for instance by the oxygen plasma treatment.

These coating methods presume corresponding ion or plasma sources and vacuum technology and thus involve substantial equipment complexity and costs. These methods are moreover time-consuming since the polymer surface to be simultaneously treated is limited to the diameter of the ion beam. A further drawback of these methods is that they are direction-dependent, i.e. good results are obtained only if the surface of the workpiece to be treated can be oriented nearly perpendicularly to the ion or plasma beam. As a result, polymer surfaces with cavities and curvatures as well as wall areas that are oriented parallel to the ion beam cannot be adequately treated.

SUMMARY OF THE INVENTION

Thus, the object of the invention is to provide a method for waterproofing the surface of a polymer workpiece, which is suitable also to treat polymer surfaces with cavities and curvatures in a simple and cost-effective manner.

The method for waterproofing the surface of a polymer workpiece is characterized by the following process steps:

a) the workpiece is treated with at least one organic solvent that swells the surface of the polymer workpiece and b) at least one waterproofing substance, which is an organosilicon compound dissolved in the solvent, diffuses into the surface of the polymer workpiece, and c) after a contact time, the solvent is removed from the polymer workpiece, and at least a portion of the waterproofing substance remains embedded in the surface of the polymer workpiece.

This method is used to waterproof the surface of a polymer work piece by using an organic solvent to swell the polymer surface and to serve as a carrier for at least one waterproofing substance contained in the solvent. This causes the waterproofing substance, which is an organosilicon compound, to diffuse into the surface of the polymer workpiece together with the solvent. After a contact time, the organic solvent is removed from the polymer workpiece, while at least a portion of the waterproofing substance remains embedded in the surface of the polymer work piece. This embedding advantageously takes place due to the interaction of the waterproofing substance with the polymer chains in the surface of the polymer work piece. To foster this embedding of the waterproofing substance into the surface of the polymer material, the organosilicon compound preferably has bulky organic groups, which through steric interaction with the polymer chains prevent the embedded waterproofing substance from diffusing out of the surface of the polymer material. As a result, as well as due to the hydrolysis stability of the organosilicon compound relative to water, a long-term effect of the inventive waterproofing of the surface of a polymer material is achieved. Furthermore, the treated polymer workpiece can be used in areas with elevated temperatures and/or regions with high outside temperatures.

The inventive embedding of a waterproofing substance, which is an organosilicon compound, into the surface of the polymer workpiece reliably prevents the specific interaction between the hydroxyl groups and the functional groups of the polymer matrix, e.g. carbonyl groups, and thus blocks access to the polymer matrix for liquid or gaseous hydroxyl group-containing substances, such as glycerin, water or water vapor.

The preferred treatment method of a polymer workpiece is to immerse the polymer workpiece into a bath with an organic solvent that contains the inventive waterproofing substance. After a brief contact time, during which the polymer surface swells due to the solvent and the waterproofing substance diffuses into the polymer surface, the polymer workpiece is removed from the bath. The polymer workpiece is then dried, which causes the solvent to evaporate out of the polymer matrix and at least a portion of the waterproofing material to remain embedded between the polymer chains in the polymer workpiece. Consequently, the inventive method for waterproofing the surface of a polymer workpiece can be used to treat any polymer surfaces with cavities and curvatures. This method is furthermore particularly simple and cost-effective and can be used at almost any place since only a bath and small amounts of the inventive waterproofing substance are required.

The publication by Katz et al., "Ultraviolet Protection of Transparent PVC Sheets by Diffusion Coatings," Proceedings of the A.C.S. Div. of Org. Coatings and Plastics, 36 (1), pp. 202–205 (1976) describes a diffusion or impregnation process of a UV absorbing material into a PVC workpiece to increase UV resistance. In this process, an organic solvent is used as the carrier for the UV stabilizer. The PVC workpiece is swelled by means of the organic solvent and the UV stabilizer is thereby introduced into the polymer workpiece. After drying, the UV stabilizer remains in the polymer surface.

Variations of this method for introducing a UV stabilizer into the polymer surface are known and are described in European Patent Application EP 0 306 006 A2. The described methods disclose no hints regarding either a method for waterproofing the surface of a polymer workpiece or the inventive waterproofing substance, which is an organosilicon compound.

Preferably the waterproofing substance is an organosiloxane, an alkyl silyl fluoride, an aryl silyl fluoride, an alkyl aryl silyl fluoride, or an alkoxy silyl fluoride.

According to a first embodiment, the organosilicon compound is an organosiloxane. Organosiloxanes comprise both linear molecules of the formula $R_3Si—[OSiR_2]_n—O—SiR_3$ with $n \geq 0$, as well as cyclic molecules of the formula $[OSiR_2]_m$ with $m \geq 3$, where R represents same or different organic groups. Preferably R is an alkyl group R' or an aryl group R", as specified in further detail below. An example of a linear organosiloxane according to the first formula given above is 1,1,3,3-tetraisopropyl disiloxane-1,3-diyl. An example of a cyclic organosiloxane according to the second formula given above is octamethyl cyclotetrasiloxane.

According to embodiments 2 to 5, the organosilicon compound is an alkyl silyl fluoride, an aryl silyl fluoride, an alkyl aryl silyl fluoride, or an alkoxysilyl fluoride.

Alkyl silyl fluorides according to the second embodiment comprise molecules of the general formula $R'_nSiF_{4-n}$ with $n \geq 2$, preferably n=3, where R' represents same or different alkyl groups. The preferred groups R' are specified in greater detail below. Examples of such alkyl silyl fluorides according to the above formula with preferred groups R' are (triisopropyl)silyl fluoride, di-tert-butyl silyl difluoride and dimethyl trityl silyl fluoride.

Aryl silyl fluorides according to the third embodiment comprise molecules of the general formula $R''_nSiF_{4-n}$, with $n \geq 2$, preferably n=3, where R" represents same or different aryl groups. Preferred aryl groups R" are specified in greater detail below. Particularly preferred aryl silyl fluorides are diphenyl silyl difluoride and triphenyl silyl fluoride (TPSF). A particular advantage of using TPSF is its good solubility in known solvents, which are used to swell the polymer workpiece. This ensures high flexibility of the inventive method, since the surfaces of any polymer material can be treated by simply selecting a suitable solvent.

Alkyl aryl silyl fluorides according to the fourth embodiment comprise molecules of the general formula $R'_nR''_mSiF_{4-n-m}$ with $n \geq 1$, $m \geq 1$ and $n+m \geq 2$, preferably n+m=3, where R" represents same or different aryl groups and R' same or different alkyl groups. Preferred groups R' and R" are specified in greater detail below. Examples of such alkyl aryl silyl fluorides according to the above formula with preferred groups R' and R" are dimethyl phenyl silyl fluoride, diphenyl methyl silyl fluoride, tert-butyl diphenyl silyl fluoride, and (pentafluorophenyl) dimethyl silyl fluoride.

Alkoxy silyl fluorides according to the fifth embodiment comprise molecules of the general formula $(RO)_nR_mSiF_{4-n-m}$ with $n \geq 1$, $m \geq 0$ and $n+m \geq 2$, preferably n+m=3, where R stands for the same or different aryl groups R" or alkyl groups R'. Preferred groups are specified below. An example of a preferred alkoxysilyl fluoride is tert-butyl oxydiphenyl silyl fluoride.

It is also feasible according to the invention to use a mixture of one or more organosilicon compounds, preferably according to the above embodiments.

A preferred alkyl group R' according to the above embodiments is a linear or branched alkyl group R' with 1 to 4 C atoms, such as methyl, ethyl, n-propyl, i-propyl, n-butyl, i-butyl or tert-butyl. Particularly preferably, one or more groups R' are bulky groups, such as i-propyl, i-butyl or tert-butyl. To achieve bulkiness, one or more alkyl groups R' can also have bulky substituents, such as an aryl group. An example of such a group R' is triphenylmethyl-, which is also referred to as trityl-. To increase the waterproofing action, one or more alkyl groups R' are advantageously monosubstituted or multiply substituted with fluorine.

A preferred aryl group R" according to the above embodiments is a phenyl group. To increase the waterproofing action, one or more aryl groups R" are advantageously monosubstituted or multiply substituted with fluorine.

Preferably, the waterproofing substance is used in the solvent at concentrations of between 1% by weight and 55% by weight.

In a first preferred variant of the invention, the waterproofing substance in the solvent is used at a concentration of between 1% by weight and 10% by weight. The use of such small amounts of the waterproofing substance, e.g. triphenyl silyl fluoride, is preferred particularly for the waterproofing of optical polymer surfaces, since this makes it possible to retain the optical quality of the surfaces, e.g. their reflection properties.

In a second preferred variant of the invention, the waterproofing substance in the solvent is used at a concentration of between 10% by weight and 55% by weight. With the use of these correspondingly larger percentages of the waterproofing substance in the solvent, a layer with a particularly high content of the waterproofing substance forms in the polymer surface. Furthermore, our own tests have shown that the use of the correspondingly large percentages of the waterproofing substance in the solvent enables the formation of a layer of the waterproofing substance on the polymer surface. These tests have also shown that the formation of this layer on the polymer surface can be prevented if the polymer workpiece is rinsed with a solvent, e.g. ethanol, isopropanol or toluene, immediately after the inventive treatment.

Preferably, the workpiece is treated at a temperature of below the melting temperature of the waterproofing substance. The upper temperature limit of the dipping bath must be selected below the glass transition temperature of the polymer workpiece to be treated to ensure the dimensional stability of the workpiece. The lower temperature limit of the dipping bath is determined, respectively, by the polymer workpiece to be treated and by the selection of the solvent based on the swellability of the polymer workpiece.

Preferably, the workpiece is treated at a temperature ranging between 0° C. and 60° C. This makes it possible to use simple heating devices to heat the dipping bath. Since it is especially preferred to carry out the treatment of the workpiece in the dipping bath at room temperature, i.e. between 10° C. and 30° C., it is even possible to dispense with a corresponding heating device.

Preferably a mixture of at least two organic solvents is used. At least the first solvent should be capable of swelling the surface of the polymer workpiece and at least the second solvent of dissolving the hydrophobic substance. This results in a wide range of possible selections for both the first and the second solvent. The two solvents and their corresponding percentages by weight are selected as a function of the polymer workpiece to be treated and the waterproofing substance. For instance, acetone is preferably used in small amounts to dissolve the waterproofing agent, such as triphenyl silyl fluoride.

For the organic solvent, one or more solvents is preferably selected from the group comprising the low-molecular ($C_1$–$C_{10}$) saturated or unsaturated, linear, branched or cyclic, possibly substituted alkanes, alcohols, ethers, esters, aldehydes, ketones, N,N-dialkyl amides, aromatic compounds. Examples of the solvents of the above group are hexane, heptane, octane, nonane, decane, decahydro naphthalene, methanol, ethanol, propanol, hexafluoropropanol, butanol, pentanol, hexanol, di-n-butyl ether, tert-butyl methyl ether, butyl acetate, tetrahydrofuran, methyl-, ethyl-, propyl-, butyl- or pentylacetate, acetone, hexafluoroacetone hydrates, methyl ethyl ketone, methyl isobutyl ketone, cyclopentanone, cyclohexanone, N,N-dimethylformamide, N,N-dimethyl acetamide, toluene, or xylene. To swell the surface of the polymer workpiece, preferably a polar solvent is used for polar polymers and preferably a solvent of low polarity for non-polar polymers.

Particularly preferred organic solvents are butyl acetate, acetone and/or toluene. In the first variant of the invention, the use of butyl acetate is preferred since this solvent readily dissolves the TPSF active substance and also ensures that the optical quality, e.g. reflection properties, of the surfaces is retained when, for instance, PMMA polymer surfaces are treated. The use of toluene is preferred for short residence times of the polymer workpiece in the solvent.

Preferably, the polymer workpiece comprises a thermoplastic or an elastomer polymer material. Examples of such polymer materials made of a thermoplastic material are polystyrene (PS), polypropylene (PP), polyethylene (PE), cyclo-olefine copolymer (COC), polymethylmethacrylate (PMMA), polycarbonate (PC), polyoxymethylene (POM), polysulfone (PSU), polyphenylene ether (PPE), polyetheretherketones (PEEK), polyether imide (PEI), polybutylene terephthalate (PBT), polyacrylate, self-reinforcing partially crystalline polymers (LCP), polyethylene terephthalate (PET), polyvinylidene fluoride (PVDF), cyclo-olefin polymer (COP), polyvinyl acetate, polyvinylidene chloride, a copolymer based on acrylonitrile, butadiene and styrene (ABS) or a copolymer based on acrylates and ethylene. Examples of such polymer materials made of an elastomer are polyurethane (PUR), polybutadiene (BR), ethylene propylene terpolymer (EPDM), nitrite rubbers (NBR), styrene butadiene rubber (SBR), and natural rubber (NR).

Preferably, the polymer workpiece is treated with a contact time of less than 2 hours, preferably less than ½ hour. Thus the inventive waterproofing of the surface of a polymer workpiece requires very little time.

Preferably, the waterproofing substance remains in the surface of the polymer workpiece to a penetration depth of less than 50 $\mu$m, particularly less than 20 $\mu$m. This shallow penetration depth of the waterproofing substance, e.g. TPSF active substance, into the surface of the polymer workpiece prevents mechanical deformation and stresses in the polymer workpiece and thus the formation of cracks along the polymer surface.

Preferably, the solvent is removed by applying a vacuum to the polymer workpiece and/or by heating the polymer workpiece.

Removal of the solvent by applying a vacuum to the polymer workpiece is particularly preferred in polymer workpieces with cavities, since this requires little time to remove the solvent from the cavities.

In polymer workpieces with curvatures, smooth surfaces and/or cavities that are directly accessible from the surface, the solvent is preferably removed from the polymer workpiece by heating or drying. The preferred drying temperature ranges from 10° C. to 60° C. This prevents the waterproofing substance from diffusing out of the polymer surface. It also makes it possible to use simple and inexpensive drying equipment. Especially preferred is the use of room temperature (approximately 10° C. to 30° C.) for drying, since this eliminates the need for drying equipment. In the case of the first preferred variant of the invention and the use of low percentages of the waterproofing substance, the treated polymer workpiece is preferably dried at room temperature. In general, the polymer workpiece can be used for its intended purpose directly after removal of the solvent from the polymer surface.

A particular advantage of the invention is that the inventive waterproofing makes it possible to treat surfaces of a polymer workpiece and workpieces with polymer surfaces of any shape and size. This makes it possible to prevent diffusion of liquid or gaseous hydroxyl group-containing substances, e.g. water, water vapor or glycerin, including, e.g., in any component housings made of a polymer material of optical, mechanical, electronic or other components, with little time being required and at low costs.

Additional aims, advantages, features and possible applications of the present invention result from the following description of several exemplary embodiments with reference to the drawings. All the described and/or depicted features are the subject of the invention either per se or in any meaningful combination, irrespective of their summarization in the claims or the referencing.

DETAILED DESCRIPTION OF THE INVENTION

Figure 1A:
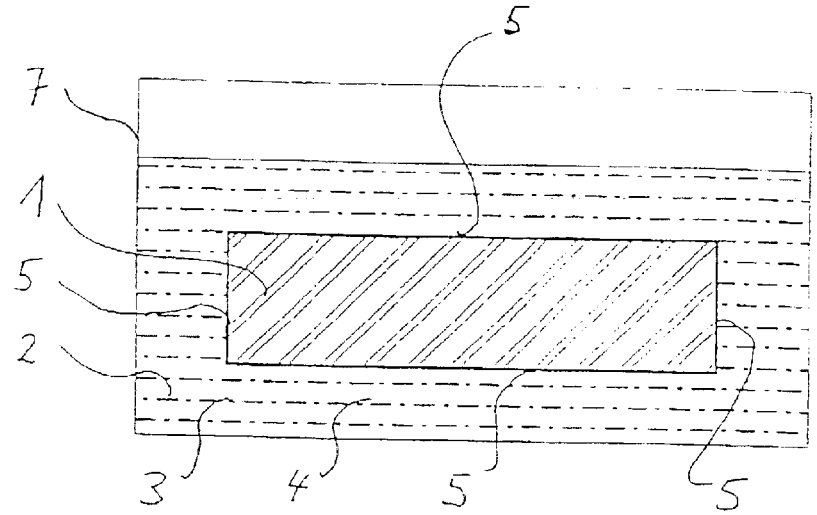
FIGS. 1a-c illustrates an inventive treatment of a polymer workpiece in a dipping bath comprising a solvent and the waterproofing substance contained therein.
Figure 1B:
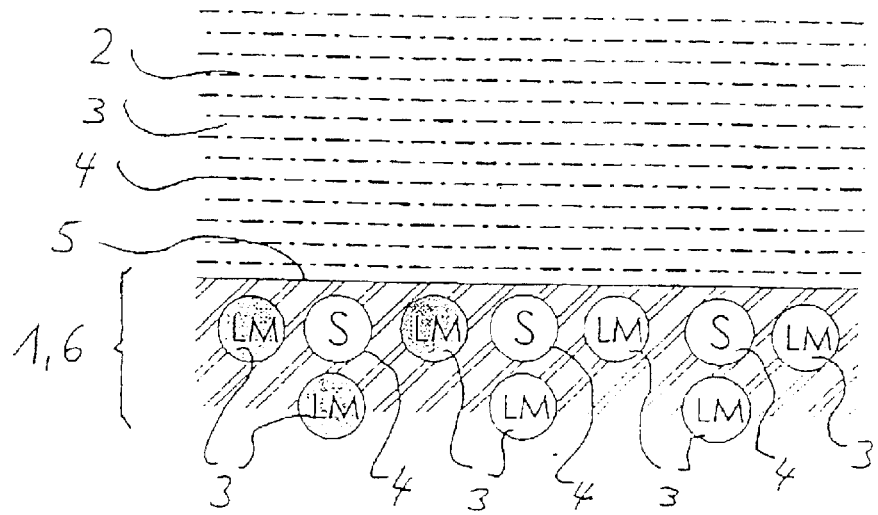
Figure 1C:
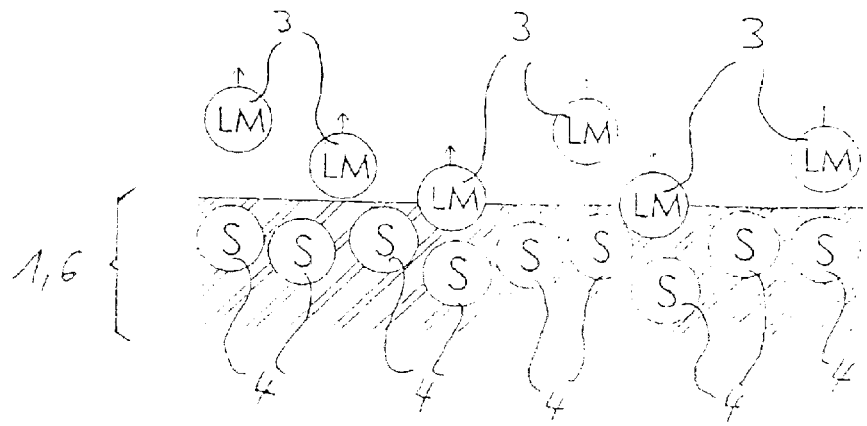

FIGS. 1a to 1c show an inventive treatment for waterproofing a polymer workpiece 1 in a vessel 7 filled with a dipping bath 2 to prevent diffusion of liquid or gaseous hydroxyl group-containing substances, e.g. water, water vapor or glycerin, from penetrating into the surface 5, 6 of a polymer workpiece 1.

Test 1

In a first exemplary embodiment of the invention, the inventive waterproofing of a polymer workpiece 1 was tested for protection against water. For this purpose, an untreated PMMA workpiece 1 (GS type Plexiglas by Röhm) was divided into four test samples. One of these test samples was subsequently used as an untreated first PMMA reference sample and a second test sample was stored in distilled water for two months and subsequently used as the second PMMA reference sample. The other two test samples were used as the first and second comparison sample and for this purpose were treated by means of the inventive process after they were divided. According to FIG. 1, the two PMMA comparison samples were immersed for 20 minutes at room temperature in an inventive dipping bath 2 consisting of butyl acetate 3 and 3% by weight of triphenyl silyl fluoride (TPSF) 4 dissolved therein. The butyl acetate 3 caused the polymer surfaces 5 to swell. Consequently, the butyl acetate 3 as the carrier and the TPSF active substance 4 dissolved therein can diffuse into a layer 6 of the polymer surface 5 as shown in FIG. 1b. Thereafter, the two comparison samples were removed from the dipping bath 2 and air-dried at room temperature. According to FIG. 1c, this drying process causes the butyl acetate 3 to escape from layer 6 of the polymer surface 5 and at least a portion of the TPSF active substance 4 to remain embedded in layer 6 of polymer surface 5. This concludes the inventive treatment for waterproofing the surface 5, 6 of the polymer workpiece 1 and the polymer workpiece 1 can be used for its intended purpose.

Subsequently, the first PMMA comparison sample was also stored in distilled water for two months. For experimental proof of the inventive waterproofing of the polymer surface 5 of PMMA workpiece 1, approximately 50 $\mu$m thick layers each were removed from the two PMMA reference samples and the two PMMA comparison samples and examined by means of infrared absorption spectroscopy as shown in FIG. 2a.

The comparison of the FTIR absorption spectra of the reference samples and the comparison samples makes it possible to show the specific interaction between the functional carbonyl groups of the polymer surface 5 and the liquid or gaseous hydroxyl group-containing substances, e.g. glycerin, water or water vapor, which may have diffused into the polymer surface 5. If these substances have diffused into the polymer workpiece 1 of a comparison sample and a specific interaction between the functional carbonyl groups of the polymer material and the hydroxyl groups of the diffused substance has taken place, the associated FTIR absorption spectrum shows a shift of both the characteristic absorption bands of the carbonyl groups, the so-called carbonyl peak, e.g. at a wave number of 1731.8 $cm^{-1}$ in PMMA and the characteristic absorption bands of the hydroxyl groups in water or glycerin.

Figure 2A:
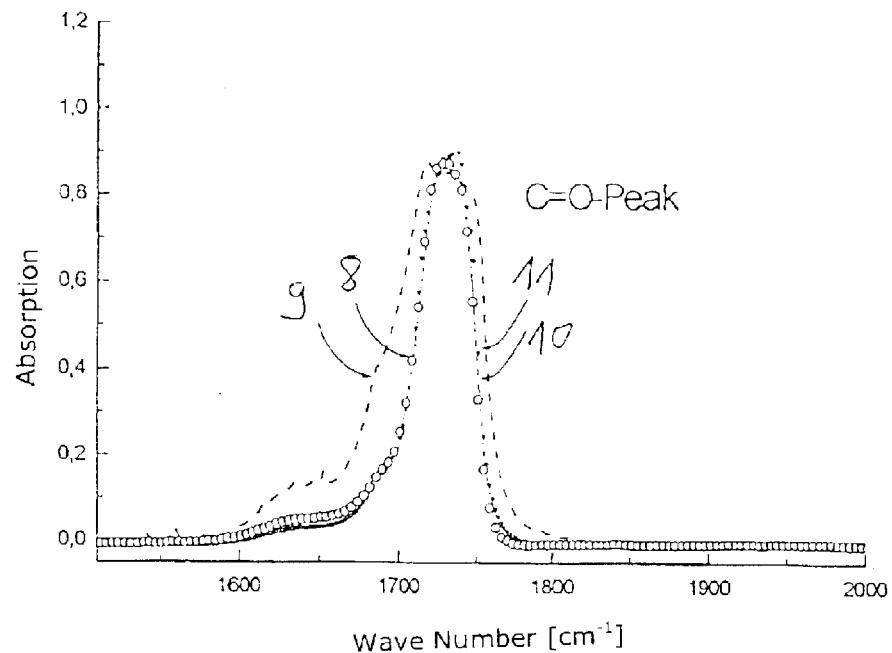
FIG. 2a is a comparison of FTIR absorption spectra of an untreated reference sample of a polymer workpiece and a reference sample that was stored in water and two comparison samples that were previously treated according to the invention.

FIG. 2a shows a comparison of the carbonyl peak of the four FTIR absorption spectra taken with an infrared absorption spectrometer (Nicolet MAGNA 850) through a microscope (Nicolet NIC PLAN) of the first untreated PMMA reference sample (curve 8), the second PMMA reference sample stored in water (curve 9), the first PMMA comparison sample treated according to the invention and stored in water (curve 10), and the second PMMA comparison sample treated according to the invention (curve 11) without water contact of the PMMA workpiece 1.

According to FIG. 2a, curve 9 of the second PMMA reference sample with water contact compared to curve 8 of the untreated first PMMA reference sample shows a widening and a shift of the carbonyl peak toward shorter wave numbers. This widening and shift can be attributed to a specific interaction between the functional carbonyl groups of the polymer surface 5 of the second PMMA reference sample and the hydroxyl groups of the water that have diffused into the polymer surface 5. In contrast, the comparison of the corresponding carbonyl peak of curve 11 of the second PMMA comparison sample without water contact and curve 10 of the first PMMA comparison sample with water contact shows that both curves are nearly identical with curve 8 of the first untreated PMMA reference sample and are thus clearly distinct from curve 9 of the second PMMA reference sample with water contact. This shows that the inventive treatment of the PMMA workpiece 1 according to the two PMMA comparison samples prevents diffusion of water into the surface 5, 6 of the PMMA workpiece 1. This is the first experimental evidence of the inventive waterproofing of the polymer surface 5 of a PMMA polymer workpiece 1.

Test 2

In a second exemplary embodiment of the invention, the inventive waterproofing of a PMMA polymer workpiece 1 was tested for protection against glycerin. For this purpose, the experimental procedure used in test 1 was repeated, except that the second PMMA reference sample and the first PMMA comparison sample were stored in glycerin for two months.

Figure 2B:
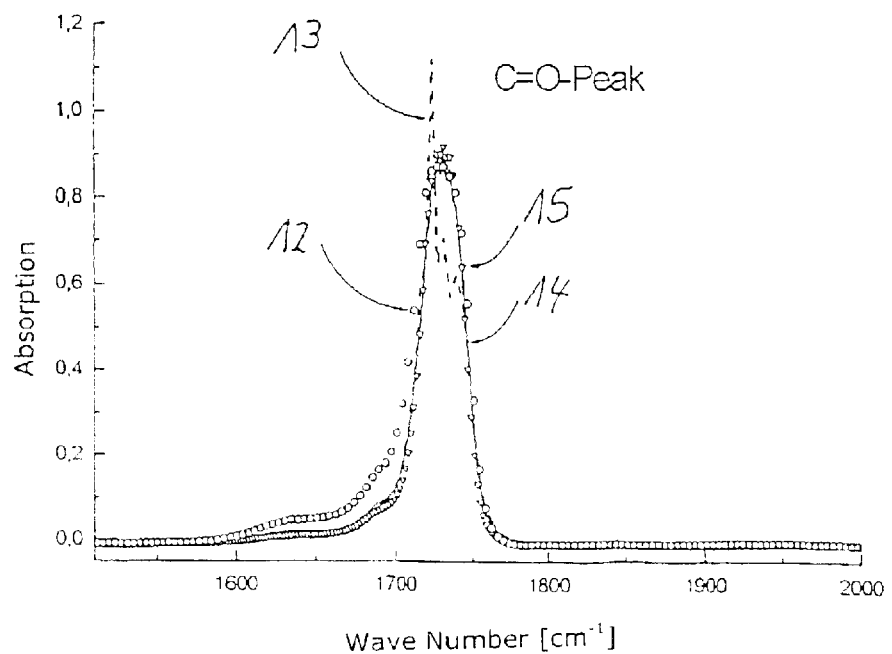
FIG. 2b is a comparison of the FTIR absorption spectra of an untreated reference sample of a polymer work piece and a reference sample stored in glycerin and two comparison samples that were previously treated according to the invention.

FIG. 2b shows a comparison of the carbonyl peak of the four FTIR absorption spectra taken with the infrared absorption spectrometer (Nicolet MAGNA 850) through a microscope (Nicolet NIC PLAN) of the first untreated PMMA reference sample (curve 12), the second PMMA reference sample stored in glycerin (curve 13), the first PMMA comparison sample treated according to the invention and stored in glycerin (curve 14), and the second PMMA comparison sample treated according to the invention (curve 15) without glycerin contact of the PMMA workpiece 1.

A comparison of curve 13 of the second PMMA reference sample with glycerin contact and curve 12 of the untreated first PMMA reference sample shows a shift of the carbonyl peak toward the shorter wave numbers. This shift can be attributed to a specific interaction between the functional carbonyl groups of the polymer surface 5 of the second PMMA reference sample and the hydroxyl groups of the glycerin that have diffused into the polymer surface 5 of the second PMMA reference sample. In contrast, a comparison of curve 14 of the first comparison sample with glycerin contact and curve 15 of the second comparison sample without glycerin contact shows that both curves 14, 15 are nearly identical and, in distinction to the two curves 12, 13 of the two reference samples, are measured without a shift of the carbonyl peak toward shorter wave numbers. This demonstrates that the inventive treatment of the PMMA workpiece 1 according to the two PMMA comparison samples prevents diffusion of glycerin into the surface 5, 6 of the PMMA workpiece 1. This is the second experimental evidence of the inventive waterproofing of the polymer surface 5 of a polymer workpiece 1.

Test 3

In a third exemplary embodiment of the invention, the inventive waterproofing of a PMMA polymer workpiece 1 was tested for protection against water vapors. For this purpose, an untreated PMMA workpiece 1 (Röhm GS Plexiglas) was first divided into four samples. These PMMA samples were then weighed on a balance having an accuracy of ±0.1 mg. The average weight of the four samples was determined to be approximately 0.7 g. One of the PMMA samples was subsequently used as the untreated PMMA reference sample. The other three PMMA samples were subsequently used as PMMA comparison samples and for this purpose were treated in an inventive dipping bath 2 according to FIG. 1 for 20 minutes at room temperature. The first PMMA comparison sample was treated according to the invention in toluene with a TPSF concentration of 12% by weight, the second PMMA comparison sample in toluene with a TPSF concentration of 23% by weight and the third PMMA comparison sample in butyl acetate with a TPSF concentration of 32% by weight. Thereafter, the three PMMA comparison samples were removed from dipping bath 2 and air-dried at room temperature. Subsequently, the second and third PMMA comparison samples were rinsed under running toluene. Such an after-treatment with toluene prevents the formation of a TPSF layer on the surface 5 of the associated PMMA comparison sample. Subsequently, the reference sample and the comparison samples were placed into a climatic chamber at a temperature of 60° C. and 90% air humidity for approximately 5 days. Finally, the PMMA reference sample and the three PMMA comparison samples were weighed regularly during the duration of the experiment to determine the water absorption into the corresponding polymer surface 5 of the associated PMMA workpiece 1.

Figure 3:
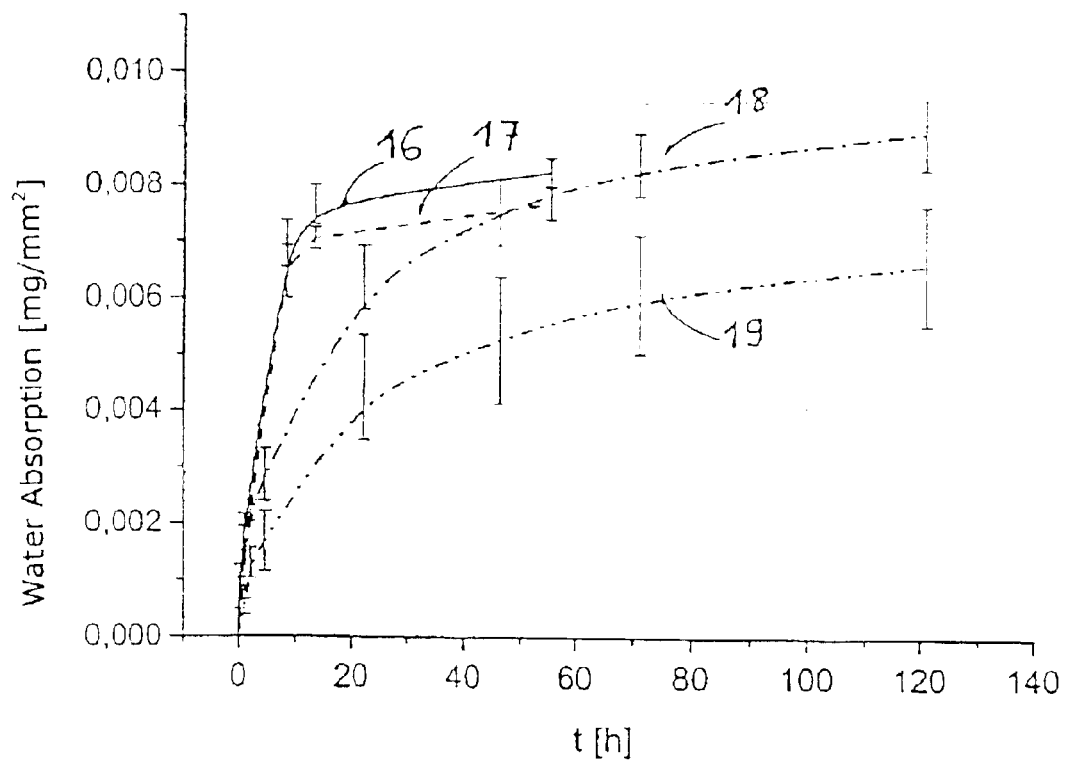
FIG. 3 is a comparison of the absorption of water vapor of a reference sample of a polymer workpiece as a function of time and three comparison samples that were previously treated according to the invention, in which the concentration of the waterproofing substance was varied.

FIG. 3 shows a comparison of the change in weight as a function of time due to water or water vapor absorption of the PMMA reference sample (curve 16) and the first comparison sample (curve 17), the second comparison sample (curve 18) and the third comparison sample (curve 19), which were treated according to the invention. The comparison of curve 16 of the PMMA reference sample and curve 17 of the first PMMA comparison sample shows that the water absorption rate is nearly identical in the range of the first 10 hours. Thereafter, the two curves 16 and 17 show that the inventive treatment of the first PMMA comparison sample with TPSF concentrations of 12% by weight in toluene is capable of reducing the absolute amount of water absorbed in the range of the first 60 hours compared to the untreated PMMA reference sample.

A comparison of curve 18 of the second PMMA comparison curve and the two curves 16 and 17 shows that the treatment of the second PMMA comparison sample with a higher TPSF concentration of 23% by weight in toluene clearly reduces the amount of water absorbed. The comparison of curve 18 and curve 17 shows that the treatment of the second PMMA comparison sample with a higher TPSF concentration makes it possible to reduce the absolute amount of water absorbed up to approximately 50 hours after the inventive treatment of the PMMA comparison sample and that subsequently the absolute amount of water absorbed is almost equal. A comparison of curve 18 of the second PMMA comparison sample and curve 16 of the PMMA reference sample shows that the inventive treatment of the second PMMA comparison sample clearly reduces the absolute amount of water absorbed up to approximately 70 hours after the inventive treatment of the PMMA comparison sample.

A comparison of curve 19 of the third PMMA comparison sample and curves 16 to 18 shows that a further increase in the TPSF concentration to 32% by weight dissolved in butyl acetate clearly reduces both the water absorption rate and the amount of water absorbed over the entire test duration of approximately 5 days.

The results of the use of the TPSF active substance dissolved in butyl acetate in the experiment according to Test 1 compared with the experiment according to Test 2 show that the use of small TPSF percentages of less than 10% by weight is sufficient to prevent liquid hydroxyl group-containing substances, e.g. water or glycerin, from diffusing into the polymer surface 5. A further comparison with the experiment according to Test 3 shows that to prevent gaseous hydroxyl group-containing substances, e.g. water vapor, from diffusing into the polymer surface 5 and/or at elevated temperatures, the use of higher TPSF percentages, e.g. 32% by weight, enhances the waterproofing of PMMA workpieces 1.

Reference Numerals

1 polymer workpiece
2 dipping bath
3 solvent
4 waterproofing substance
5 polymer surface
6 layer
7 dipping vessel
8–19 curve
FIG. 2a and FIG. 2b
Absorption
Wave Number
FIG. 3
Water Absorption

What is claimed is:

1. A method for waterproofing a surface of a polymer workpiece, comprising the steps of:
   treating the workpiece with at least one organic solvent that swells the surface of the polymer workpiece, and
   diffusing at least one waterproofing substance, which is an organosilicon compound and is dissolved in the solvent into the surface of the polymer workpiece, and
   after a contact time, removing the solvent from the polymer workpiece, while at least a portion of the waterproofing substance remains embedded in the surface of the polymer workpiece.

2. A method according to claim 1, wherein the waterproofing substance used is an organosiloxane, an alkyl silyl fluoride, an aryl silyl fluoride, an alkyl aryl silyl fluoride, or an alkoxy silyl fluoride.

3. A method according to claim 1, wherein the waterproofing substance is used in the solvent at a concentration of between 1% by weight and 55% by weight.

4. A method according to claim 3, wherein the waterproofing substance is used in the solvent at a concentration of between 1% by weight and 10% by weight.

5. A method according to claim 3, wherein the waterproofing substance is used in the solvent at a concentration of between 10% by weight and 55% by weight.

6. A method according to claim 1, wherein the workpiece is treated at a temperature of below the melting temperature of the waterproofing substance.

7. A method according to claim 1, wherein the workpiece is treated at a temperature of between 0° C. and 60° C.

8. A method according to claim 1, wherein a mixture comprising at least two organic solvents, of which at least the first solvent is capable of swelling the surface of the polymer workpiece and at least the second solvent is capable of dissolving the waterproofing substance is used.

9. A method according to claim 1, wherein an organic solvent comprising one or more solvents selected from the group consisting of the low-molecular ($C_1$–$C_{10}$) saturated or unsaturated, linear, branched or cyclic, possibly substituted alkanes, alcohols, ethers, esters, aldehydes, ketones, N,N-dialkyl amides, aromatic compounds is used.

10. A method according to claim 1, wherein the polymer workpiece comprises a thermoplastic or elastomeric polymer material.

11. A method according to claim 1, wherein the polymer workpiece is treated for a contact time of less than 2 hours.

12. A method according to claim 11, wherein the polymer workpiece is treated for a contact time of less than ½ hour.

13. A method according to claim 1, wherein the waterproofing substance remains in the surface of the polymer workpiece at a penetration depth of less than 50 µm.

14. A method according to claim 13, wherein the waterproofing substance remains in the surface of the polymer workpiece at a penetration depth of less than 20 µm.

15. A method according to claim 1, wherein the solvent is removed by applying a vacuum to the polymer workpiece and/or by heating the polymer workpiece.

* * * * *